W. C. CORYELL.
GRINDING MACHINE.
APPLICATION FILED AUG. 27, 1918. RENEWED NOV. 14, 1921.

1,401,961.

Patented Jan. 3, 1922.
2 SHEETS—SHEET 1.

INVENTOR
William C. Coryell.

W. C. CORYELL.
GRINDING MACHINE.
APPLICATION FILED AUG. 27, 1918. RENEWED NOV. 14, 1921.
1,401,961.
Patented Jan. 3, 1922.
2 SHEETS—SHEET 2.
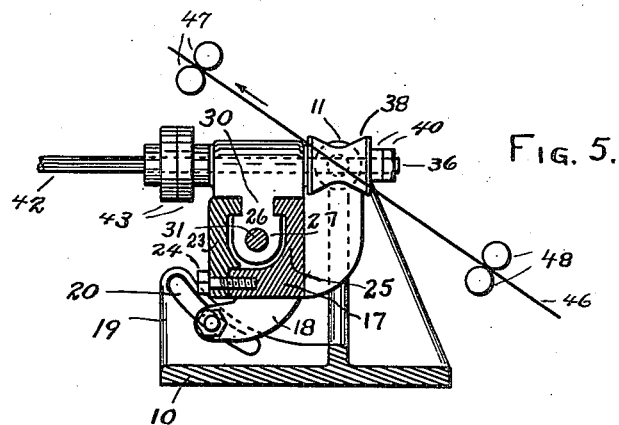
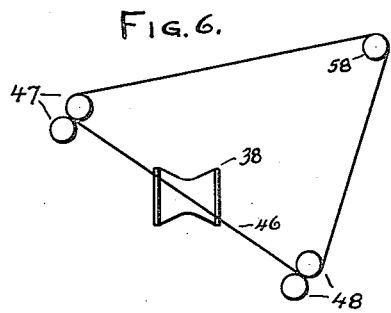
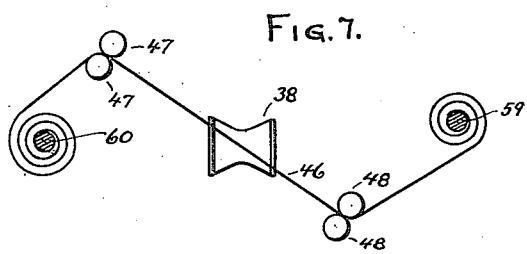
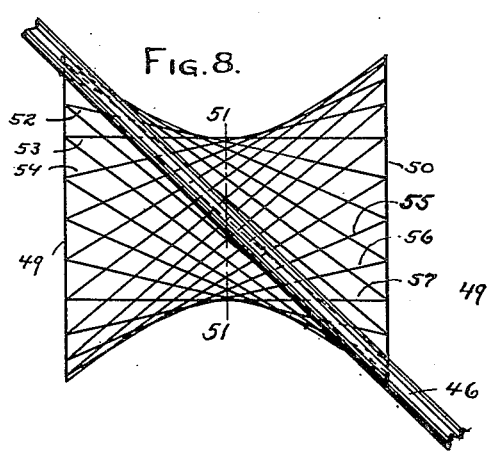
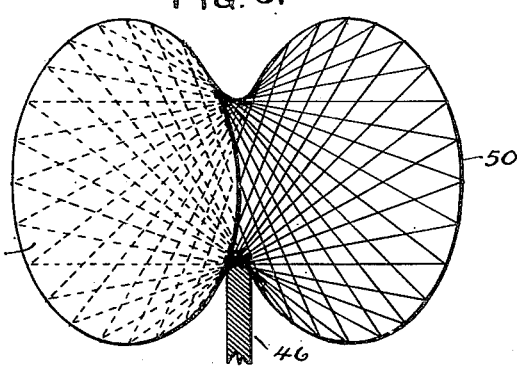
INVENTOR
William C. Coryell.

UNITED STATES PATENT OFFICE.

WILLIAM C. CORYELL, OF YOUNGSTOWN, OHIO, ASSIGNOR TO THE POWER ENGINEERING COMPANY, OF YOUNGSTOWN, OHIO, A CORPORATION OF OHIO.

GRINDING MACHINE.

1,401,961.   Specification of Letters Patent.   Patented Jan. 3, 1922.

Application filed August 27, 1918, Serial No. 251,634. Renewed November 14, 1921. Serial No. 515,069.

*To all whom it may concern:*

Be it known that I, WILLIAM C. CORYELL, a citizen of the United States, residing at Youngstown, in the county of Mahoning and State of Ohio, have invented certain new and useful Improvements in Grinding Machines, of which the following is a specification.

The present invention relates to grinding machines for use in dressing the faces and edges of solids such as pipes, shapes, strips, bands, belts, sheets, plates and bars, of metal, glass and other materials, whether such dressing be rough grinding, polishing, burnishing, or buffing.

The principal object of the invention is to produce a machine of this class which will operate efficiently upon such solids through a wide range of shapes and dimensions. More specific objects are to provide guiding and feeding means which will hold a flexible object under tension while it is being worked upon by the dressing wheels; to provide wheels for dressing both edges or faces of a piece of work at the same time; to provide means for adjusting said wheels toward and from each other to suit pieces of different widths and for adjusting those wheels in planes at right angles to the plane of feeding so as to vary the extent of the engagement between the wheel and the solid worked upon; to provide a work engaging face on the dressing wheel which will engage the work throughout a considerable length and also will vary the curvature of the finished edge of the work in response to slight changes in the adjustment of the wheels.

The dressing wheel in combination with other parts of the machine is claimed herein but the dressing wheel is claimed by itself and as a separate article of manufacture in my application, Serial No. 367,749, filed March 22, 1920, as a division of this application.

Other features and advantages will be apparent from the following detailed description when considered in connection with the accompanying drawing. The scope of the invention will be pointed out in the appended claims.

Figure 1:
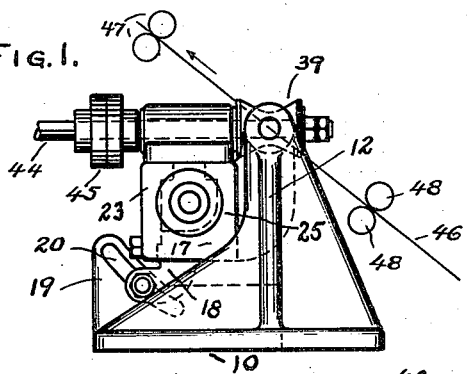
Figure 2:
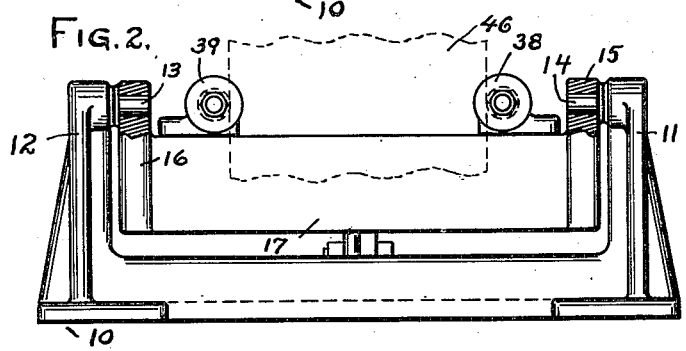
Figure 3:
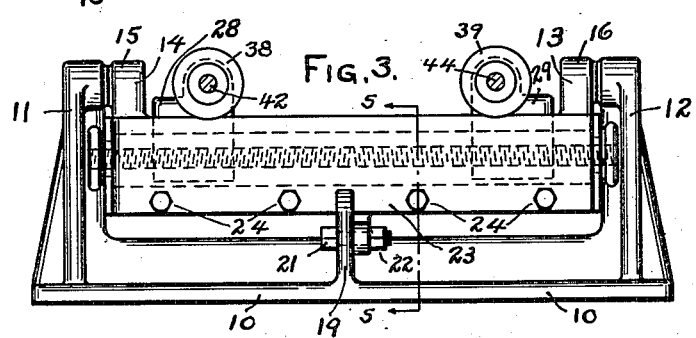
Figure 4:
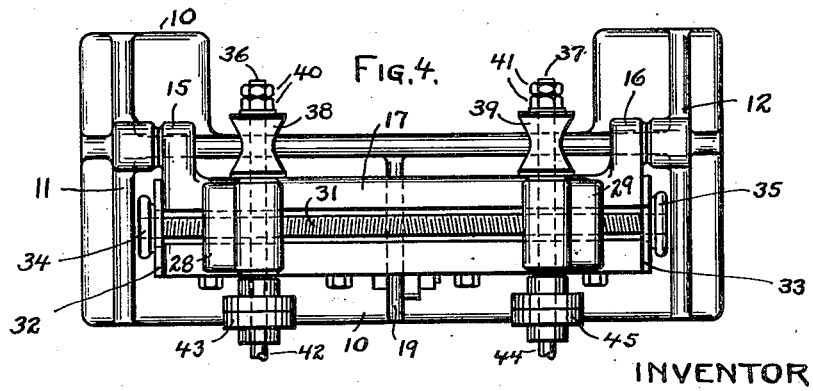

In said drawings, Fig. 1 is an end elevation of a grinding machine constructed in accordance with the present invention illustrating the work and the work-guiding rolls in diagram; Fig. 2 is a side elevation of the same with the guiding rolls omitted, the view being taken from the right in Fig. 1; Fig. 3 is a side elevation viewed from the opposite side and showing the driving shafts in section; Fig. 4 is a plan view of the same; Fig. 5 is a sectional elevation, the plane of section being indicated by the line 5—5 of Fig. 3; Fig. 6 is a diagram illustrating a grinding wheel operating upon the edge of an endless belt guided by suitable guide rolls; Fig. 7 is a similar diagram showing the grinding wheel working upon the edge of a continuous flexible strip guided by the guide rolls in its passage from one spindle to another; Fig. 8 is a diagram illustrating one form of surface for the grinding wheels; and Fig. 9 is a diagram of the same wheel and an associated piece of work showing how the elements of the grinding surface cooperate to produce a curved edge upon the work. Throughout these views like characters refer to like parts.

Referring to said drawings in detail, 10 designates the base of the machine from which the uprights 11 and 12 extend. These uprights which extend upward from the ends of the base 10 are provided with trunnions 14 and 13 respectively. These trunnions are shown more particularly in Fig. 2 where parts are broken away to show their location. The trunnions 14 and 13 extend into openings near the upper ends of the hangers 15 and 16 respectively of a carrier 17 which is movable about the axis of the trunnions as a center. The carrier 17 is provided with a depending arm 18 which is movable along one edge of a web 19 which extends upwardly from a portion of the base 10 of the frame. The web 19 is provided with a slot 20 which is concentric with the axis of the trunnions. A bolt 21 passing through the slot 20 and an opening in the arm 18 is provided with a nut 22 which may be screwed down so as to firmly clamp the parts 18 and 19 together in any desired working position. By this means the carrier 17 may be set for any desired adjustment. The carrier 17 is provided with a plate 23 which is secured in place by a number of bolts 24. The upright portion 25 of the carrier 17 and the plate 23 attached to the carrier serve to form a guiding slot 26 for the depending portions 27 of the boxes 28 and 29. Each of the latter has a neck 30 which is engaged on either side by overhanging portions of the parts 23 and 25 of the carrier. Since the bearing between the neck 30 and these over-hanging portions is considerable for each box, it will be seen that the boxes cannot be shifted laterally of the carrier 17. These portions, however, may be shifted longitudinally of said carrier. In order to bring about an equal rate of travel for each of the boxes and in order to cause them to move toward and from each other uniformly, a screw 31 is provided. This screw extends through the end plates 32 and 33 of the carrier and is provided with hand wheels 34 and 35 fixed at the opposite ends. One half of the screw 31 is provided with a right hand thread and the other half with a left hand thread. The latter actuates box 28 and the former box 29.

The boxes 28 and 29 support shafts 36 and 37 upon which are mounted the spool-shaped dressing wheels 38 and 39. Suitable nuts 40 and 41 upon the ends of the shafts 36 and 37 serve to hold the wheels 38 and 39 up against the ends of the boxes 28 and 29. The parts are proportioned so that the portions of the wheels 38 and 39 which are of least diameter lie in the axis of the trunnions 13 and 14, and the latter axis intersects the axes of the shafts 36 and 37. Adjustments of the boxes 28 and 29 by means of the screw 31 do not change this relation. Such adjustments merely bring the wheels 38 and 39 closer together or move them farther apart. The shaft 36 is driven from the shaft 42 to which it is coupled by a suitable coupling 43. Similarly the shaft 37 is driven from a shaft 44 to which it is connected by a coupling 45. The universal couplings 43 and 45 are such as are commonly used in mechanical engineering practice to connect up the ends of adjustable shafts with a driving source, and consequently will allow for all the necessary adjustment of the carrier 17 and the parts supported by it.

The solid upon which the dressing wheels 38 and 39 operate as previously indicated may range from a bar or plate of a considerable thickness to a very thin sheet or belt. Such a piece of work, designated 46, is fed upward between the dressing wheels 38 and 39. In order to give a properly rounded or curved edge to the work it must be fed along a plane in which the axis of the trunnions lies. The work is fed by the guiding or feed rolls 47 and 48. Where the material is flexible it should be maintained under tension while passing between the dressing revolving wheels 38 and 39. To accomplish this result, the rolls 47 are therefore preferably power-driven so as to exert a constant pull upon a piece of work, and the rolls 48 may be braked so as to exert a slight retarding pull upon the work as it passes upward between the dressing wheels. Other equally good means may be provided for maintaining the work under tension. With the work always fed along the plane indicated it will be seen that each dressing wheel will give a suitably rounded or curved surface according to the adjustment of the dressing wheels 38 and 39, which, as before pointed out, have their adjustment determined by the adjustment of the carrier 17.

The work-engaging surface of the dressing wheels 38 and 39 is conoidal in the case illustrated. In Figs. 8 and 9 the surface is that of a hyperboloid of revolution. Such surface is generated by rotating a line about the axis of rotation, said line being inclined to the axis and lying in a different plane from it. In Figs. 8 and 9 the disks 49 and 50 are connected by two sets of straight line elements. Either set of elements constitutes different positions of the inclined line by which the surface is generated. By reference to these diagrams it will be seen that the generating line comes nearest to its axis in the plane indicated by the line 51—51. The point in the generating line which traverses this plane generates a circle. If the piece of work were of infinitesimal thickness and located in this plane then there would be no rounding of the engaged edge, but, theoretically, it would be a flat surface of infinitesimal width. However, as soon as the work is increased in thickness, while still maintained in this same plane, it becomes slightly rounded, as will be apparent from an inspection of Fig. 8. As soon as the work is inclined with reference to this plane then the degree of curvature increases. In these diagrams the strip of work 46 is shown inclined at a considerable angle to the transverse plane indicated by the line 51—51. The strip 46 is simultaneously engaged by many elements and the degree of rounding indicated in Fig. 9 is obtained. A simple inspection of Fig. 8 will show how this rounding is accomplished. It will be seen that element 52 engages the strip 46 at a point near its left side, while the element 53 engages strip 46 at a point farther from the left side than does the element 52. Thus the left hand edge of the strip is engaged by the element 52, and at a point a little farther to the right, by element 53, and at a point still farther to the right by element 54, and so on. These elements at their point of engagement gradually approach the axis of rotation. The elements 55, 56 and 57 act similarly upon the opposite edge of the strip 46. With this brief explanation it is believed that it will be clearly understood how the wheel surface, when shaped in conformity with the diagrams of Figs. 8 and 9, will bring about the curvature of the edge of the piece of work.

In actual practice the wheel will not grind a full half circle on account of the great length of wheel which would be required, but ordinarily an arc of from 90 to 120 degrees or more can be dressed by a wheel of reasonable length. With such a wheel there is no danger of marring the surface of the strip, as the wheel at no point approaches either surface. The wheel may be composed of various materials according to the work required. In cutting it originally, the material of the wheel may be rotated about its axis while holding a thin cutting substance obliquely against it along the line of one of the elements, that is to say at the proper inclination to the axis and not in the same plane with it. For operating upon steel for polishing purposes I preferably employ stone as the material of the dressing wheel. Other materials may be used for other purposes. For example, steel cutters can be used with straight cutting inserts, or wheels with a file-like surface. In the latter case the file cuts will be produced parallel to successive positions of the generating line.

The work operated upon may vary greatly in form. For example, fins can be ground off rolled round bars, seams of welded pipe may be smoothed off, edges of plates may be dressed, etc. The edges of ship plates may also be dressed. It is now common to split one edge of the plate and sharpen the other. My machine may be used to dress this sharpened edge. Of course, the type of dressing surface on the wheel will control, in every case, the type of dressed surface on the solid.

The material worked upon may also be handled in various ways. Plates may be handled by passing them between the guide rolls 47 and 48 and moving them upward as indicated in Figs. 1 and 5, while rotating the adjacent portions of the dressing wheels 38 and 39. In the manufacture of endless steel belts, the belt may be passed between the rolls 47, 47 and 48, 48 and around an auxiliary roll 58 as indicated by the belt in Fig. 6. The belt can be kept traveling until the desired finish of its edges is obtained by the dressing wheels. Again, the material may take the form of a flexible band which may be wound off of a spindle 59 and on to a spindle 60, as indicated diagrammatically in Fig. 7. In such case the work will pass from between the guide rolls 48, 48 past the dressing wheels and through the guide rolls 47, 47 on its way from the supply spindle 59 to the receiving spindle 60. These illustrations will indicate the field of usefulness of the invention and also give some idea of its scope.

What I claim as new and desire to secure by Letters Patent of the United States is:

1. A machine for dressing the edge of a flexible solid, including means for dressing the edge of said solid, means positioned forwardly of said dressing means in the path of travel of said solid for exerting a forward pull upon said solid, and means positioned rearwardly of said dressing means in said path of travel for exerting a slightly retarding pull upon said solid whereby said flexible solid is held under tension at the point where it is engaged by said dressing means.

2. A machine for dressing the edges of a flexible solid, including pulling rolls for exerting a forward pull upon said solid to advance it, retarding rolls for exerting a slightly retarding pull on said flexible solid to maintain the portion between said pulling and retarding rolls under tension and an edge dressing wheel positioned so as to engage the edge of said solid at a point where it is maintained under tension.

3. A machine for dressing the opposite edges of a solid, including edge-dressing wheels positioned so as to engage opposite edges of said solid, relatively movable boxes for said wheels, guiding means for said boxes, and an adjusting screw having right hand and left hand threads engaging said boxes respectively whereby the rotation of said screw in one direction moves said boxes toward each other and its rotation in the opposite direction moves them from each other.

4. A machine for dressing the edge of a solid, including two pairs of guide rolls arranged to guide said solid in a plane, an edge-dressing wheel located intermediate of said pairs of rolls and having an abrading surface shaped so as to present different portions to said solid according to the angular position of said wheel relative to said plane, and means for adjusting said wheel toward and from said solid and for varying its angular position relative to said plane.

5. A machine for dressing the edge of a solid, including means for feeding said solid longitudinally, an edge-dressing wheel positioned so as to engage the edge of said solid, the engaging face of said wheel being concave and producing a cylindrical surface on the solid, and means for adjusting said wheel so as to shift the axis of rotation of said engaging face in a plane parallel to the axis of feed.

6. A machine for dressing the edge of a flat solid, including means for feeding said solid in a plane, an edge-dressing wheel positioned so as to engage one edge of said solid, said wheel having a concave conoidal engaging surface, and means for adjusting said wheel so as to shift the axis of said conoidal surface in a plane at right angles to said plane of feed.

7. A machine for dressing the edge of an endless belt, including means for continuously running the belt and maintaining it under tension at one point, and edge-dressing means for engaging said belt at said point.

8. A machine for dressing the edge of an endless belt, including rollers for causing the continuous running of said belt, said rollers operating by pulling at one point and slightly retarding at another to maintain a portion of said belt under tension, an edge-dressing wheel having a surface of variously positioned abrading elements for engaging the edge of said belt at a point where it is under tension, and means for adjusting the position of said wheel relative to the plane of that portion of said belt which is under tension.

9. A machine for dressing a solid, including a base, a carrier mounted for oscillatory adjustment in said base, boxes movable toward and from each other on said carrier, and dressing wheels journaled in said boxes, the axes of said wheels being intersected by the oscillatory axis of said carrier.

10. A machine for dressing a solid, including a base, a carrier mounted for oscillatory adjustment in said base, cooperating parts on said base and carrier and associated means for maintaining any desired oscillatory adjustment, boxes movable to and fro on said carrier in a right line at right angles to the plane of said oscillatory movement, means for securing said boxes in desired adjusted positions on said carrier, and dressing wheels journaled in said boxes and extending beyond the same, the axes of said wheels being intersected by the oscillatory axis of said carrier.

11. A machine for dressing a solid, including dressing wheels positioned so as to engage opposite portions of the solid, relatively movable boxes for said wheels, guiding means for said boxes, and an adjusting screw having right hand and left hand threads engaging said boxes respectively whereby the rotation of said screw in one direction moves said boxes toward each other and its rotation in the opposite direction moves them from each other.

12. A machine for dressing a solid, including rolls arranged to guide said solid in a plane, a dressing wheel located in said plane intermediate of said rolls and having a dressing surface shaped so as to present different portions to said solid according to the angular position of said wheel relative to said plane, and adjusting means for shifting the parts to vary the angular position of said wheel relative to said plane.

13. A machine for dressing the opposite portions of a solid, including means for feeding said solid in a plane and holding said solid against rotation in said plane, dressing wheels positioned on opposite sides of said solid and having peripheral dressing surfaces for engaging only with said opposite portions of said solid, said wheels having axes lying in a plane oblique to said feed plane, said planes intersecting each other in a right line in alignment with the dressing surfaces on said wheels, and means for adjusting said wheels about said right line as an axis to vary the obliquity of the angle between said planes.

14. A machine for dressing the opposite portions of a solid, including means for feeding said solid in a plane and holding said solid against rotation in said plane, dressing wheels positioned on opposite sides of said solid and having peripheral dressing surfaces for engaging only with said opposite portions of said solid, said wheels having axes lying in a plane oblique to said feed plane, said planes intersecting each other in a right line in alignment with the dressing surfaces on said wheels, and means for adjusting the parts about said right line as an axis to vary the obliquity of the angle between said planes.

15. A machine for dressing the opposite edges of a solid, including edge-dressing wheels having axes lying in parallel planes, means for feeding said solid in a plane with the edges of said solid in engagement with the dressing surfaces of said wheels while holding said solid against rotation in said feed plane, said feed plane being perpendicular to said parallel planes and oblique to the axis of each of said wheels, and means for rotatably adjusting said wheels through equal angles in said parallel planes, each wheel about a center located at the point at which its axis intersects said feed plane.

16. A machine for dressing the edge of a flexible solid, including means for moving said solid so as to repeatedly bring the same point in the solid to a working point and maintaining said solid under tension at said working point, and power-driven dressing means for engaging said solid at said working point to dress said solid.

17. A machine for dressing the edge of a flexible solid, including means for moving said solid so as to repeatedly bring the same point in the solid to a working point and maintaining said solid under tension at said working point, said means including pulling rollers located in advance of said working point and retarding rollers located to the rear of said working point, a dressing wheel positioned so as to engage the edge of said solid at said working point, and means for adjusting the parts to effect a relative change in the positions of the wheel and that portion of the solid which is under tension.

18. A machine for dressing a solid, including guiding means for engaging said solid only forwardly of a working point, other guiding means for engaging said solid only rearwardly of said working point, both of said guiding means cooperating to guide said solid in a plane and to maintain said solid against rotation in said plane, a dressing wheel located at said working point and having a dressing surface shaped so as to present different portions to said solid according to the angle between said plane and the axis of said wheel, and adjusting means for shifting the parts to vary said angle.

19. A machine for dressing the opposite edges of a solid, including guiding means for engaging said solid only forwardly of a working point, other guiding means for engaging said solid only rearwardly of said working point, both of said guiding means cooperating to guide said solid in a plane and to hold said solid against rotation in said plane, and edge-dressing wheels positioned on opposite sides of said solid and operative to engage only the opposite edges of said solid at said working point, said wheels having axes lying in a plane oblique to said feed plane and intersecting the latter in a right line extending across said solid at said working point.

20. A machine for dressing the opposite edges of a solid, including edge-dressing wheels having peripheral dressing surfaces positioned on opposite sides of said solid and operative to engage only said opposite edges of said solid, said wheels having axes lying in planes parallel to each other and to the axis of feed of said solid, means for guiding said solid with its edges in engagement with said peripheral dressing surfaces in a plane perpendicular to said parallel planes and oblique to the axes of said wheels, and means for rotatably adjusting the parts about centers of rotation in said feed plane to vary the angle between each of said axes and said feed plane equal amounts.

21. A machine for dressing a solid, including means for feeding said solid in a plane, and dressing wheels for engaging said solid, the engaging faces of said wheels being concave and operative to produce cylindrical surfaces on said solid, and the plane of the axes of said wheels being perpendicular to vertical planes through said axes and oblique to said plane of feed.

22. A machine for dressing a solid including dressing wheels having peripheral dressing surfaces, said wheels being spaced apart and the peripheral dressing surface of each wheel being a surface of rotation about the axis of the wheel and concavely curved transversely of the plane of the wheel, and means for feeding the solid between said wheels with longitudinally extending portions of the solid in engagement with said dressing surfaces respectively, said means feeding the solid in a plane and maintaining the solid against rotation in said plane, and the direction of said plane being oblique to the axes of said wheels.

23. A machine for dressing a solid including a dressing wheel having a peripheral dressing surface, said surface being a surface of rotation about the axis of the wheel and concavely curved transversely of the plane of the wheel, and means for feeding the solid past said wheel while maintaining a longitudinally extending portion of it in engagement with said dressing surface, said means feeding said solid in a plane and maintaining the solid against rotation in said plane, said plane being oblique to the axis of said wheel and containing a right line perpendicular to said axis, said line passing through a point of engagement of said solid with said dressing surface.

24. A machine for dressing a solid, including a dressing wheel having a concave peripheral surface of rotation composed of rectilinear elements inclined to the axis of the wheel and lying in different planes than said axis and intersecting parallel planes perpendicular to said axis in the circumferences of circles having centers in said axis, and means for feeding the said solid along and against said surface of rotation, said means feeding the solid in a plane and maintaining the solid against rotation in said plane, said plane intersecting said surface of rotation in a line closely approaching and slightly inclined to the rectilinear elements as they pass said plane.

25. A machine for dressing a solid, including a dressing wheel having a concave peripheral surface of rotation composed of rectilinear elements inclined to the axis of the wheel and lying in different planes than said axis and intersecting three parallel planes perpendicular to said axis in the circumferences of circles having centers in said axis, the circle of the intermediate plane being of less diameter than the circles of the other planes, and means for feeding the solid along and against said surface of rotation, said means feeding the solid in a plane and maintaining the solid against rotation in said plane, said plane intersecting said surface of rotation in a line closely approaching and slightly inclined to the rectilinear elements as they pass said plane.

In testimony whereof I have hereunto set my hand this 27th day of August, 1918.

WILLIAM C. CORYELL.